United States Patent [19] [11] 4,422,353
Suga et al. [45] Dec. 27, 1983

[54] LOCK-UP CONTROL METHOD OF AND SYSTEM FOR AUTOMATIC TRANSMISSION FOR AUTOMOTIVE VEHICLE HAVING ENGINE PROVIDED WITH FUEL CUT MEANS

[75] Inventors: Masaaki Suga, Yokohama; Yoshiro Morimoto, Yokosuka; Hideo Hamada, Yokosuka; Masaaki Futagi, Yokosuka; Tadashi Suzuki, Yokosuka, all of Japan

[73] Assignee: Nissan Motor Co., Ltd., Yokohama, Japan

[21] Appl. No.: 308,663

[22] Filed: Oct. 5, 1981

[30] Foreign Application Priority Data

Oct. 3, 1980 [JP] Japan .................. 55-137718

[51] Int. Cl.³ .................. B60K 41/02; B60K 41/18
[52] U.S. Cl. .................. 74/858; 74/866; 74/869; 192/0.044; 192/3.58; 192/3.31
[58] Field of Search .................. 74/869, 868, 867, 866, 74/858, 857, 752 A; 192/0.044, 0.073, 0.076, 0.092, 0.094, 3.31, 3.58, 103 R

[56] References Cited

U.S. PATENT DOCUMENTS

| | | | |
|---|---|---|---|
| 2,620,908 | 12/1952 | Orr et al. | 74/858 |
| 3,667,577 | 6/1972 | Weymann | 74/858 |
| 3,741,042 | 6/1973 | Ravenel | 74/866 |
| 3,814,224 | 6/1974 | Podssuweit et al. | 74/858 |
| 4,226,141 | 10/1980 | Espenschied | 74/858 |
| 4,371,050 | 2/1983 | Ikeura | 74/866 |

Primary Examiner—Kenneth Dorner
Assistant Examiner—D. Wright
Attorney, Agent, or Firm—Schwartz, Jeffery, Schwaab, Mack, Blumenthal & Koch

[57] ABSTRACT

The control system controls a lock-up type automatic transmission such that the forced lock-up of a lock-up torque converter is released only after a predetermined condition after the supply of fuel to the engine has been resumed by a fuel supplying means.

10 Claims, 16 Drawing Figures

LOCK-UP CONTROL METHOD OF AND SYSTEM FOR AUTOMATIC TRANSMISSION FOR AUTOMOTIVE VEHICLE HAVING ENGINE PROVIDED WITH FUEL CUT MEANS

BACKGROUND OF THE INVENTION

1. Field of the Invention

The present invention relates to a control method of and system for a lock-up type automatic transmission for an automotive vehicle.

2. Description of the Prior Art

An engine provided with fuel cut means has been developed wherein the fuel cut means suspends the supply of fuel to the engine (hereinafter called as a fuel cut) after the accelerator pedal has been released to cause the vehicle to begin a coasting operation and the suspension of the supply of fuel to the engine continues as long as the engine is in an operation state which allows the engine to resume combustion upon the resumption of the supply of fuel to the engine. The predetermined state in which the engine can resume combustion may be defined by the engine speed or the vehicle speed and may be identified by a state when the engine speed is higher than a predetermined engine speed value or a state when the vehicle speed is higher than a predetermined vehicle speed value. The supply of fuel to the engine is resumed (the resumption of the supply of fuel) when the engine speed has dropped below the predetermined engine speed value while the vehicle is coasting.

With an automotive vehicle which is installed with an engine provided with such fuel cut means and which is capable of running by transmitting the power from the engine to traction wheels via an automatic transmission, since a torque converter of the automatic transmission cannot establish a non-slip direct drive connection between the engine and the traction wheels, the magnitude of a driven power, viz., a rotational power transmitted from the reaction wheels to the engine when the vehicle is coasting or decelerating, is relatively small. Thus, a drop in the engine speed upon releasing an accelerator pedal is more rapid and greater than that in the case of an automtive vehicle installed with a manual transmission. In the excessive case, the engine tends to stall during such a rapid braking operation as to bring the vehicle to a stop because the actual supply of fuel to the engine after the resumption of the supply of fuel does not occur at an appropriate timing with the drop of the engine speed and is apt to be delayed. In order to reduce this tendency, it has been the common practice to set the engine speed value at which the supply of fuel is to be resumed at a sufficiently high value in the case of the automotive vehicle having the automatic transmission as compared to the case with the automotive vehicle having the manual transmission. Thus, the time period when the engine speed remains above the predetermined engine speed value is short.

CROSS REFERENCE TO THE COPENDING APPLICATION

In the copending commonly assigned U.S. application of Tadashi SUZUKI et al entitled "CONTROL METHOD OF AND SYSTEM FOR AUTOMATIC TRANSMISSION FOR AUTOMOTIVE VEHICLE" filed on Aug. 10, 1981, Ser. No. 291,846 applicants disclosed a conrol method of and system for an automatic transmission which is intended to increase the time period of fuel cut operation. It was proposed to force a torque converter of an automatic transmission to lock up and to force the automatic transmission to downshift so as to cause an increase in the time period when the engine speed remains above the predetermined engine speed value. With the control system disclosed in this copending application, the forced downshift state of the transmission and/or lock-up state of the torque converter of the transmission are released immediately after the supply of fuel to the engine has been resumed. The release of the forced downshift state causes the transmission to upshift to the third gear position if the transmission was in the second gear position under the forced downshift state, thus causing the engine speed to drop. The release of the forced lock-up causes the engine speed to drop further as the engine is no longer in direct drive connection with the traction wheels. This rapid decrease in engine speed makes it difficult for the engine to start again. Furthermore, the initiation of the combustion in the engine takes place after a predetermined time interval after the supply of fuel to the engine has been resumed. Therefore, the engine vibrates after it has started after the resumption of the supply of fuel to the engine. In the worst case, the engine fails to start and stalls.

SUMMARY OF THE INVENTION

An object of the present invention is to provide a control method and system for a lock-up type automatic transmission having a locking-up type torque converter which is free from the above-mentioned problems.

According to the present invention, the lock-up of a torque converter of an automatic transmission is released after a predetermined condition after the resumption of the supply of fuel to the engine so as to insure a stable engine start up.

BRIEF DESCRIPTION OF THE DRAWINGS

The invention will be more apparent from the following description and drawings, in which.

DESCRIPTION OF THE PREFERRED EMBODIMENTS

Figure 1:
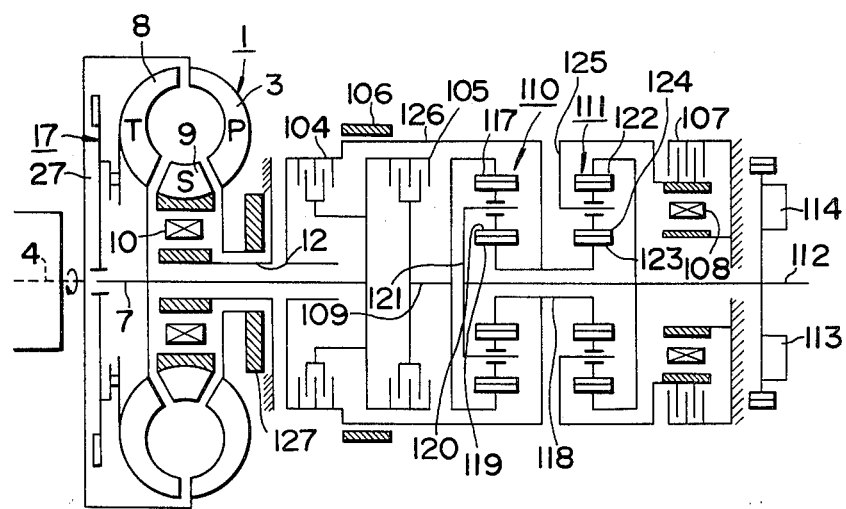
FIG. 1 is a schematic view of a planetary gear portion of an automatic transmission.

Referring to the drawings and particularly to FIG. 1, there are shown a crankshaft 4 driven by a prime mover, viz., an engine, a torque coverter 1 having a lock-up mechanism 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crank shaft 4 to circulate working oil therein so as to transmit torque to the turbine runner 8 fixed on the input shaft 7. The torque is further transmitted by the input shaft 7 to a change-speed planetary gearing. The stator 9 is disposed on a sleeve 12 via a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123, respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 116 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this case, only the rear clutch 105, a forward input clutch, is in engaged condition. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111 which is rotatable with the sun gear 119 rotates reversely, the planetary pinions 124 of the second planetary gear unit 111 rotate forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby the first forward gear ratio being established. If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby the second forward gear ratio being established. If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby the third forward gear ratio being established. In this case, the input is fed to both the front clutch 104 and rear clutch 105 and the torque increase is not carried out by the planetary gears so that none act as a reaction brake in this state.

Nextly, the power flow path in the case when the selector rod is set in R position (rearwar running) is explained.

In this case, the front clutch 104 and low-and-reverse brake 107 are engaged. The driving power transferred from the engine via the torque converter is transferred from the input shaft 7 via the front clutch 104 and the drum 126 up to the sun gears 119 and 123. In this state, since the rear planet carrier 125 is anchored by the low and reverse brake 107, the forward reaction of the sun gears 119 and 123 causes the internally toothed gear 122 to rotate in reverse direction at a reduced speed ratio, causing the output shaft 112 that is in rotary unison with this internally toothed gear 122 to provide a reverse drive.

Figure 2A:
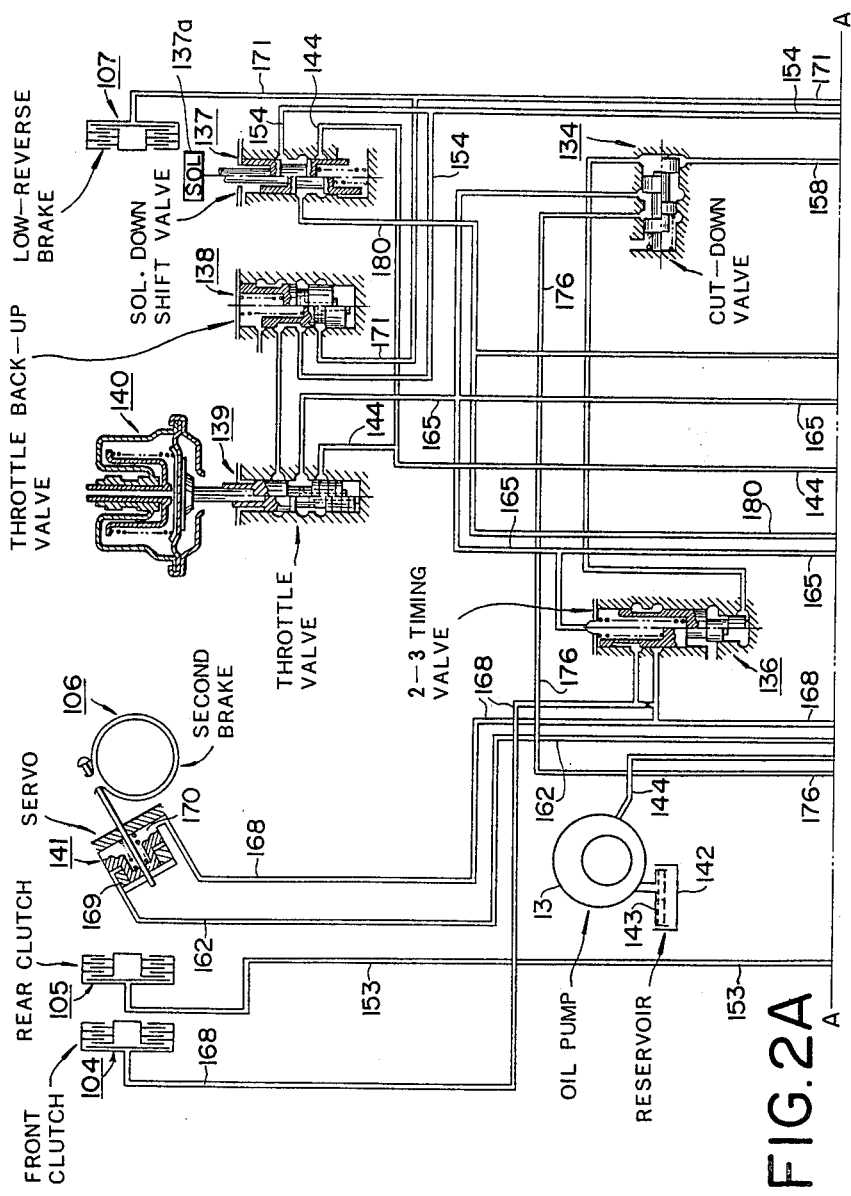
FIGS. 2A and 2B, when combined, provide a schematic view of a hydraulic control portion of the automatic transmission.
Figure 2B:
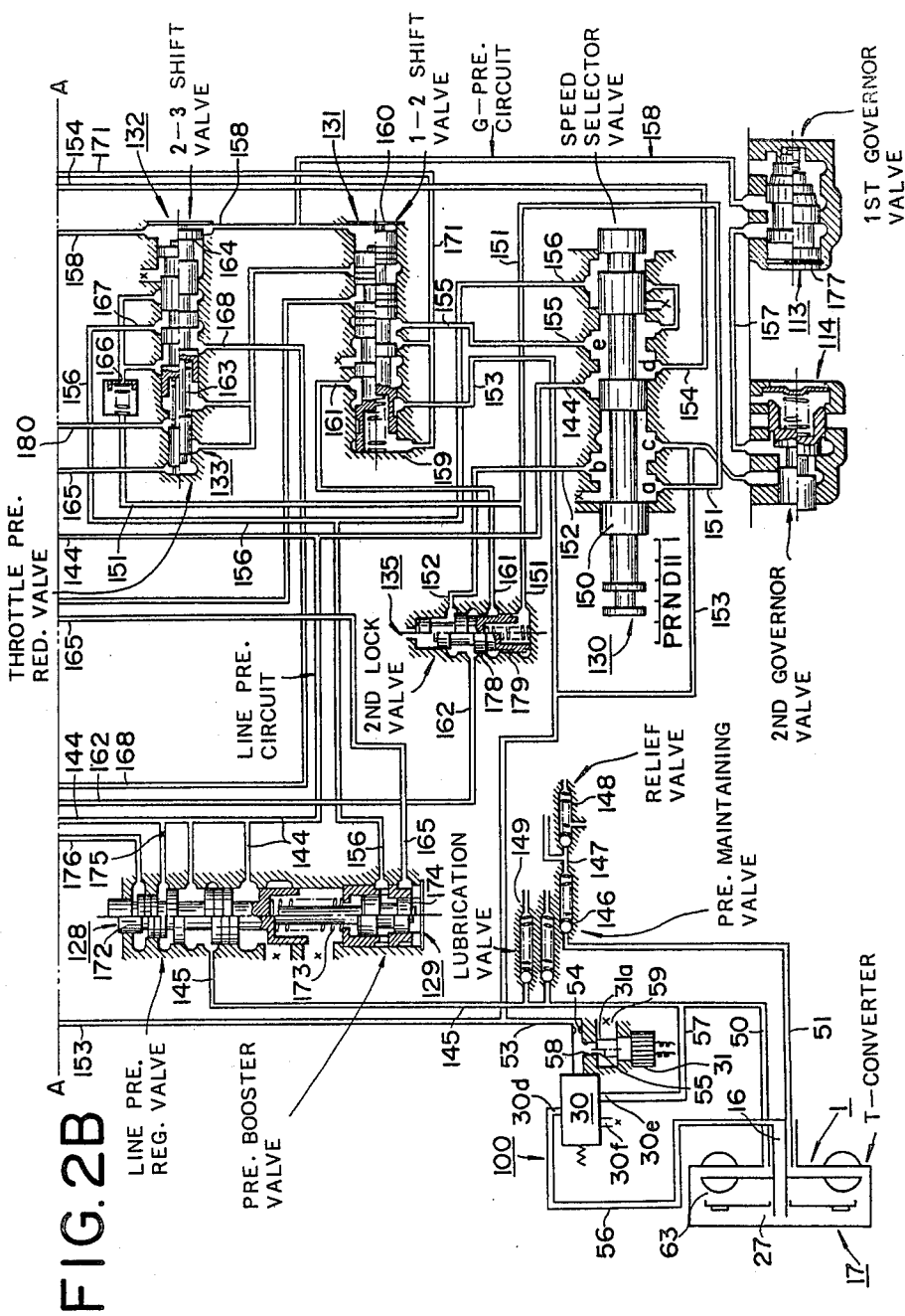

FIGS. 2A and 2B show a hydraulic control system for the above described automatic transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144.

The oil is regulated by the line pressure regulator valve 128 and the thus regulated oil is transmitted to the torque converter 1 and speed selector valve 130. The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper lands of the spool 172. The torque converter oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with two ports d and e. The first and second governor valves 113 and 114 are in operative conditions to produce a governor pressure while the automobile is moving forwardly. When the speed selector valve 130 assumes either D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, acting on the respective end surfaces of the 1-2 shift valve 131, 2-3 shift valve and cut-down valve 134 to urge them against the respective springs which urge these valves toward respective lower half positions illustrated in FIG. 2B. In the oil flow passagway leading from the port c of the speed selector valve 130 through a circuit 153, a circuit 161 and a circuit 162, up to an apply side oil pressure chamber 169, the 1-2 shift valve 131 and second lock valve 35 are separately arranged, and a circuit 152 leads from the port b of the speed selector valve 130 to the second lock-up valve 135.

If the speed selector lever 130 is set to the D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby causing the first forward gear ratio to be established in the transmission. When, under this condition, the vehicle speed increases up to a certain vehicle speed value (a vehicle speed on a 1-2 upshift line shown in FIG. 8), the governor pressure in the circuit 158 urges the spool 160 of the 1-2 shift valve 131, which is urged to the right by the spring 159, to move to the left, for effecting an upshift from the first forward speed (first gear position) to the second forward speed (second gear position), and, as a result, the circuit 153 is permitted to communicate with the circuit 161, thereby allowing the oil pressure to be transmitted through the second lock valve 135 to the apply side oil pressure chamber 169 of the servo 141 through a circuit 162 to apply the second brake 106, thus establishing the second forward gear position. Since the 1-2 shift valve 131 in this control system is minimized, the spool 160 is highly responsive to effect movement to the left with the necessary speed, so that the vehicle speed at which the upshift is made does not move toward the higher vehicle speed side from the designed speed level.

When the vehicle speed further increases up to another certain vehicle speed value (a vehicle speed value on a 2-3 upshift line shown in FIG. 8), the governor pressure in the circuit 158 urges the spool 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus the third forward speed (third gear position) is established.

If the driver depresses the acclerator pedal down to a position causing the full opening of the throttle valve during operation with the speed selector lever set in the D position (kick down range shown in FIG. 8) a kick down switch 76 (see FIG. 4) is rendered ON to energize a downshift solenoid 137a arranged to cooperate with the solenoid downshift valve 137. This urges the spool 190 of the solenoid downshift valve 137 downwardly against a spring 191 from the locked position as illustrated by the right half in FIG. 2A. This movement of the spool 190 allows the kickdown circuit 180 to communicate with the line pressure circuit 144, thus allowing the transmission of line pressure through the circuits 144 and 180 to the 1-2 shift valve 131 and the 2-3 shift valve 132 to act same in opposed relationship with the governor pressure. If, under this condition, the vehicle is operating in the third gear position the spool 164 of the 2-3 shift valve is forced to move against the governor pressure toward the right hand position viewing in FIG. 2B by the above-mentioned line pressure, thus effecting a forced downshift from the third gear position to the second gear position when the vehicle speed falls in a predetermined range (a range below a vehicle speed value $V_{32K}$ shown in FIG. 8), thus providing a sufficient amount of acceleration force. If the above-mentioned kickdown is carried out during operation in the second gear position, since the governor pressure is relatively low, the spool 160 of the 1-2 shift valve 131 is forced to move rightwardly against the governor pressure from the left hand position. This causes a forced downshift from the second gear position to the first gear position, thus providing a sufficient amount of acceleration force to meet the relatively heavy load.

If the speed selector lever is set to the II position, the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear position being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward gear ratio is prevented. As explained, the second lock valve 135 cooperates with the speed selector valve 130 to lock the transmission in the second forward gear position. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear position. The oil pressure at the port e is applied to the left end of the 1-2 shift valve assembly 131, through the circuit 171, urging to press the spool 160 to the right in cooperation with the spring 159, thereby locking the transmission in the first forward gear position once a downshift is made thereto.

Figure 3A:
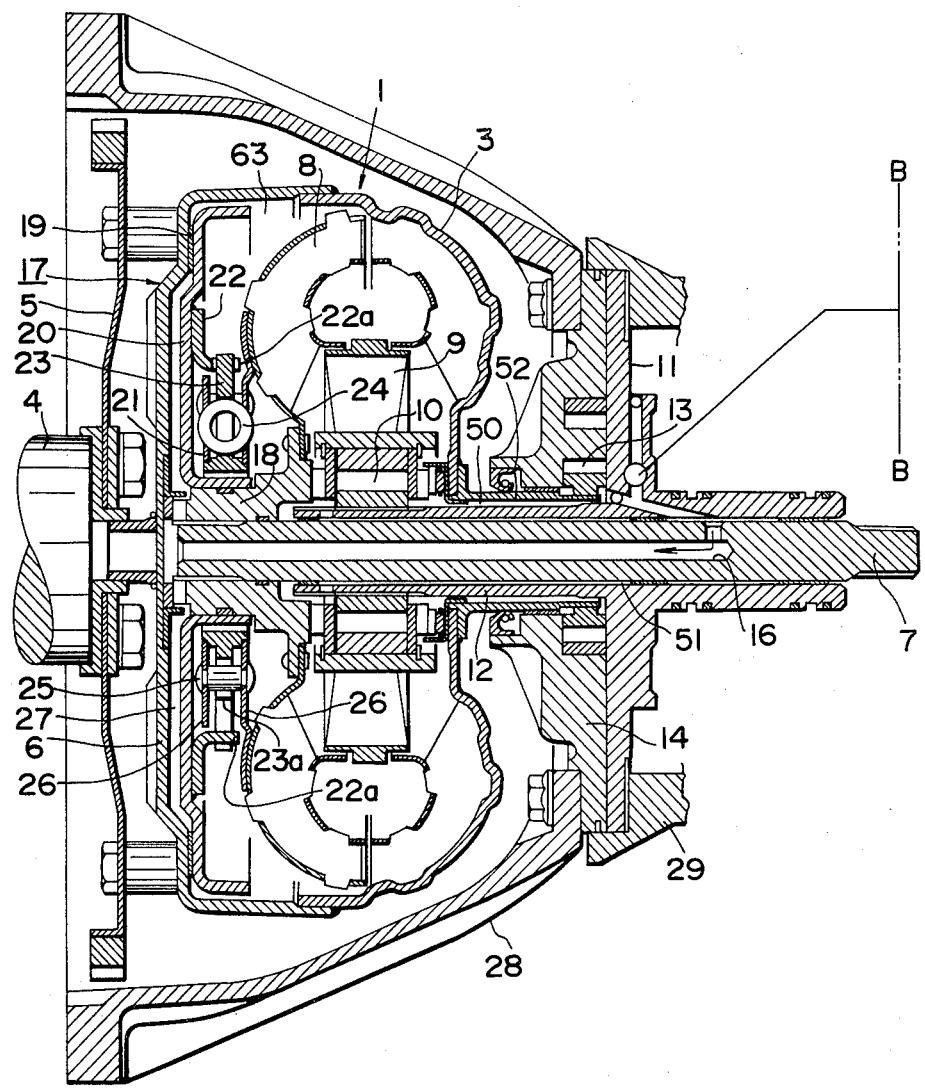
FIGS. 3A and 3B, when combined, provide a sectional view showing the torque converter with a lock-up clutch, lock-up control valve and lock-up solenoid shown in FIG. 2B.

In FIG. 2B, the reference numeral 100 denotes a lock-up control system which comprises a lock-up control valve 30 and a lock-up solenoid 31. The lock-up control valve 30, lock-up solenoid 31 and the torque converter 1 with a lock-up mechanism (direct clutch) are specifically explained hereinafter in connection with FIGS. 3A and 3B.

The pump impeller 3 of the torque converter 1 is connected via a torque converter cover 6 with a drive plate 5, which drive plate is connected to the engine crankshaft 4. The turbine runner 8 is splined to an input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which said oil pump 13 is accommodated, which pump is connected to the pump impeller 3 through a hollow shaft 52 driven by the engine. The hollow shaft 52 jackets therein a sleeve 12 to define an annular oil feed passage 50 for the torque converter oil, and the sleeve 12 allows the input shaft 7 to extend therethrough and cooperate to define therebetween a torque converter oil discharge passage 51. The sleeve 12 is formed integrally with the pump cover 11.

The lock-up mechanism 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby to provide an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

Figure 3B:
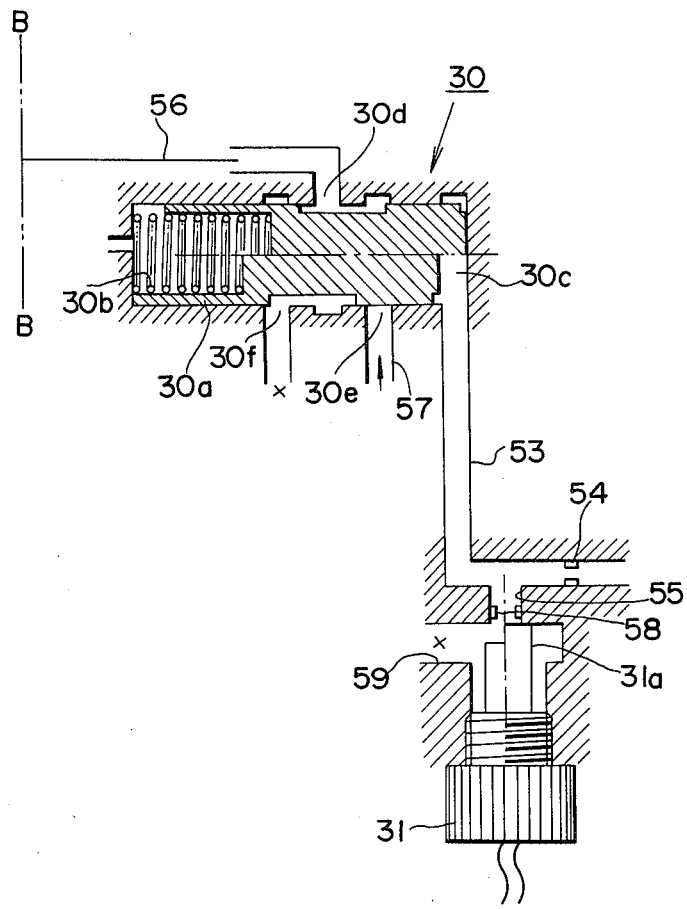

The lock-up control valve 30 is provided with a spool 30a which when taking an illustrated upper half position in FIG. 3B, permits a port 30d to communicate with a port 30e and, when taking an illustrated lower half position, permits the port 30d to communicate with a drain port 30f. The port 30d communicates through a passage 56 with the lock-up passage 16, the port 30e communicates through a branch passage 57 with the torque converter oil feed passage 50 (see FIG. 2B), and the chamber 30c communicates through a passage 53 with the rear clutch pressure passage 153 (see FIG. 2B).

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the lock-up solenoid 31 adapted to open and close the branch passage 55. For this purpose, the lock-up solenoid 31 has a plunger 31a which normally takes an illustrated left half position in FIG. 2A or FIG. 3B, but when the solenoid 31 is energized, projects to assume an illustrated right half position to close the branch passage 55.

In the event that the plunger 31a opens the passage 55 upon deenergization of the solenoid 31, this branch passage communicates with the drain port 59. Then, the rear clutch pressure directed toward the chamber 30c through the passage 53 is extracted from the drain port 59 so that since the spool 30a of the lock-up control valve 30 is conditioned to take an upper half position illustrated in FIG. 3B under the action of the spring 30b, the port 30d is allowed to communicate with the port 30e. Accordingly, the torque converter pressure led to the passage 57 is fed via the ports 30e and 30d and passages 56 and 16 upto the lock-up chamber 27, thus causing the lock-up chamber 27 to have equal pressure to that of the converter chamber 63. This causes the lock-up clutch piston 20 to move rightwardly from the illustrated position in FIG. 3 so as to disengage its clutch facing 19 from the end wall of the converter cover 6 so that since the direct connection between the pump impeller 3 and the turbine runner 8 is released, the torque converter 1 is allowed to effect normal transmission of driving power in the torque converter state.

In the event that the plunger 31a closes the branch passage upon energization of the lock-up solenoid 31, the rear clutch pressure is fed through the passage 53 to the chamber 30c so that since the spool 30a of the lock-up control valve 30 moves leftwardly from the lower half position to the upper half position viewing in FIG. 3B, the port 30d is allowed to communicate with the drain port 30f. This causes the lock-up chamber 27 to communicate through the lock-up passage 16, passage 56 and port 30d with the drain port 30f to have non-pressure state. This causes the lock-up clutch piston 20 to be moved leftwardly viewing in FIG. 3 under the effect of the torque converter pressure within the converter chamber 63 so that since the clutch facing 19 is pressed against the end wall of the converter cover 6 as illustrated in this Figure, the direct connection between the pump impeller 3 and turbine runner 8 is established to provide a lock-up state.

Figure 4:
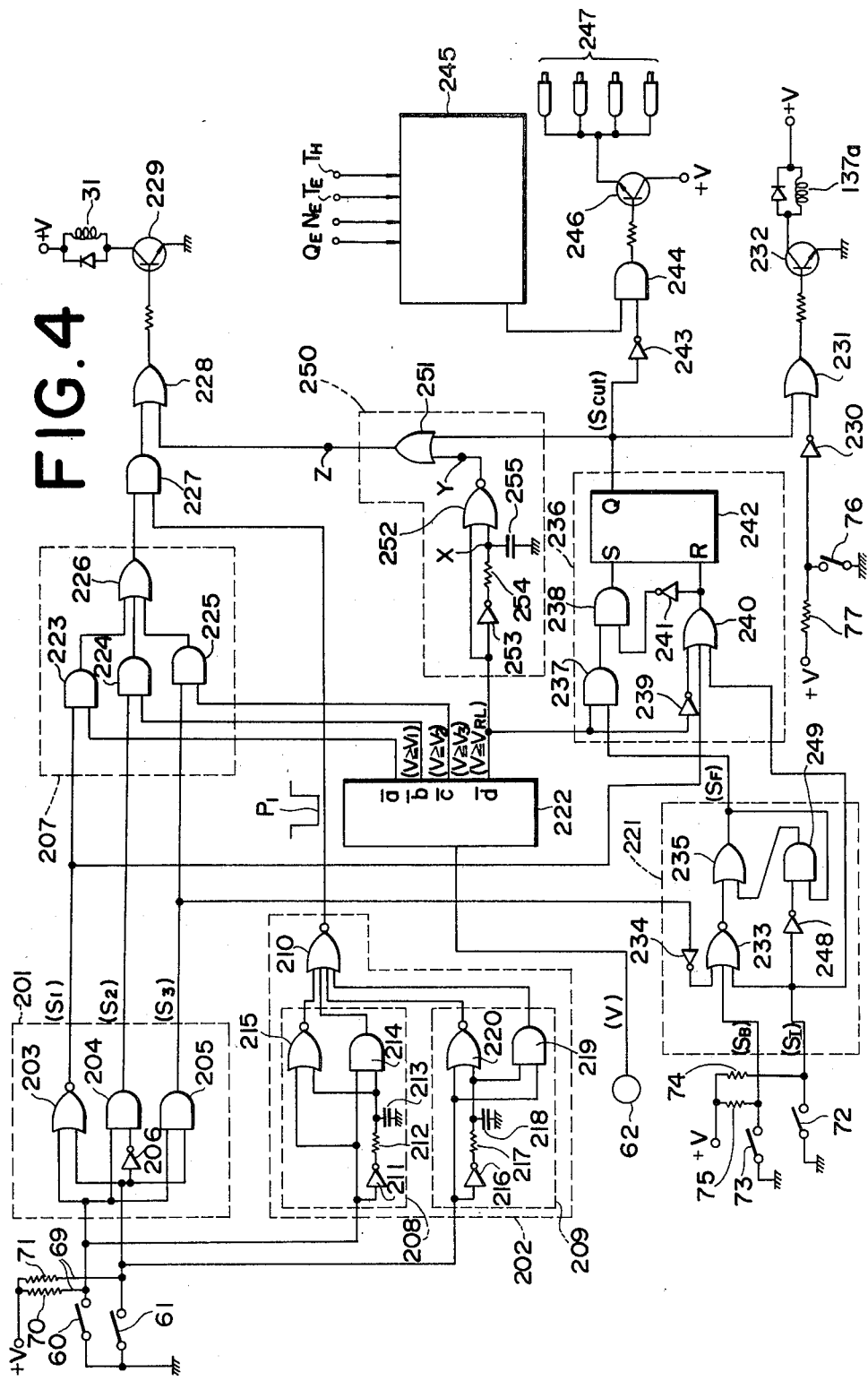
FIG. 4 is a block diagram of a control system according to the present invention.

According to the present invention, control of said automatic transmission including on and off operation of the above-mentioned lock-up solenoid 31 is effected by a control system as shown in FIG. 4. In FIG. 4, 60 designates a 1-2 shift switch, 61 designates a 2-3 shift switch, and 62 designates a vehicle speed sensor. As clearly shown in FIG. 5, the 1-2 shift switch 60 and 2-3 shift switch 61 are mounted within the 1-2 shift valve 131 and the 2-3 shift valve 132, respectively, in such a manner that they open or close in response to the positions of the respective spools 160, 164. For this purpose, stationary contacts 65, 66 are mounted at opposite positions to the valve spools 160, 164, respectively, and these stationary contacts are electrically insulated from the side plate 64 with insulators 67, 68 and cooperate with the valve spools 160, 164 which act as movable contacts. Since the shift valves 131 and 132 are grounded to the vehicle body, it is only necessary to connect respective leads 69 from the stationary contacts 65, 66 to a source of electricity +V thus enabling the stationary contact 65 and the valve spool 160 to form the 1-2 shift switch 60 and enabling the stationary contact 66 and the valve spool 164 to form the 2-3 shift switch 61.

Figure 5:
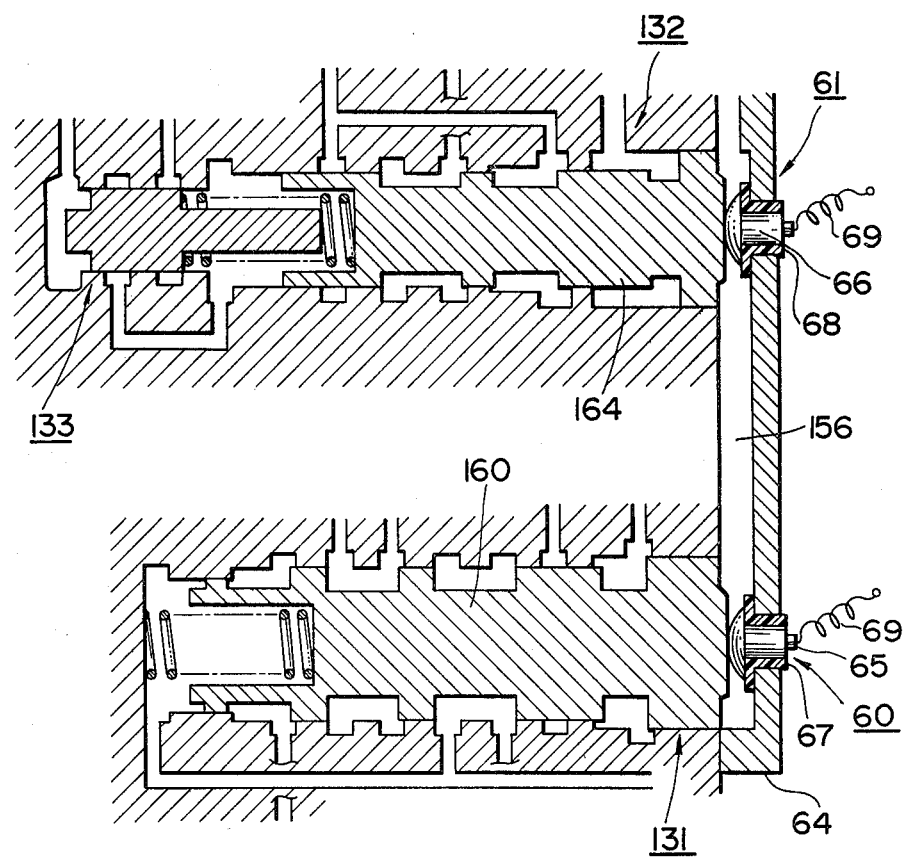
FIG. 5 is a sectional view of the 1-2 shift valve and 2-3 shift valve of the control system shown in FIG. 2B showing the structure of the shift switches used in the control system shown in FIG. 4.

As will now be understood from the preceding description, when the transmission is in the first gear position, both of the valve spools 160, 162 are in contact with the stationary contacts 65, 66 as shown in FIG. 5, thus causing the 1-2 shift switch 60 and the 2-3 shift switch 61 to produce low level signals (L). When the transmission is in the second gear position, the valve spool 160 only is in a position moved leftwardly to disengage from the stationary contact 65, thus causing the 1-2 shift switch 60 to produce a high level signal (H). When the transmission is in the third gear position, the valve spool 164 is also in a position moved leftwardly to disengage from the stationary contact 66, thus causing the 2-3 shift switch 61 to produce a H level signal.

The control system shown in FIG. 4 is provided with a gear ratio decision circuit 201 which is fed with a signal from the above mentioned 1-2 shift switch 60 and a signal from the 2-3 shift switch 61, and also provided with a gear shifting detector circuit 202. The gear ratio decision circuit 201 decides the gear position selected from the combination of signal levels of both switches 60 and 61, and comprises a NOR gate 203, AND gates 204 and 205 and NOT gate 206, wherein during operation with the first gear position when the signal levels from the both switches 60 and 61 are L levels, the output $S_1$ (the first gear ratio signal) of the NOR gate 203 only becomes H level, during operation with the second gear position when the signal level of the switch 60 only becomes H level, the output $S_2$ (second gear ratio signal) of the AND gate 204 only becomes H level, and during operation with the third gear position when the signal level from the switch 61 also becomes H level, the output $S_3$ (the third gear ratio) from the AND gate 205 only becomes H level.

The gear shifting detector circuit 202 comprises an edge trigger circuit 208 which detects a rise and a fall in the signal from the switch 60, an edge trigger circuit 209 which detects a rise and fall in the signal from the switch 61, and a NOR gate 210. The edge trigger circuit 208 comprises a NOT gate 211, a delay circuit including a resistor 212 and a capacitor 213, a AND gate 214 for detecting a signal rise, and a NOR gate 215 for detecting a signal fall. Similarly the edge trigger circuit 209 comprises a NOT gate 216, a delay circuit including a resistor 217 and a capacitor 218, a AND gate 219, and NOR gate 220. The edge trigger circuits 208 and 209 feed positive polarity pulse signals (the pulse width of which is determined by the delay circuits) to the corresponding input terminals of a NOR gate 210 when the signals from the corresponding shift switches 60 and 61 change from L level to H level or from H level to L level, viz., when a gear shift is made between gear positions. In this instance, the NOR gate 210 provides a negative polarity trigger pulse signal $P_1$ which is obtained by inverting said pulse signal, so as to adjust the pulse width of this trigger pulse signal to the period of time required for actual gear shifting operation within the automatic transmission.

Figure 8:
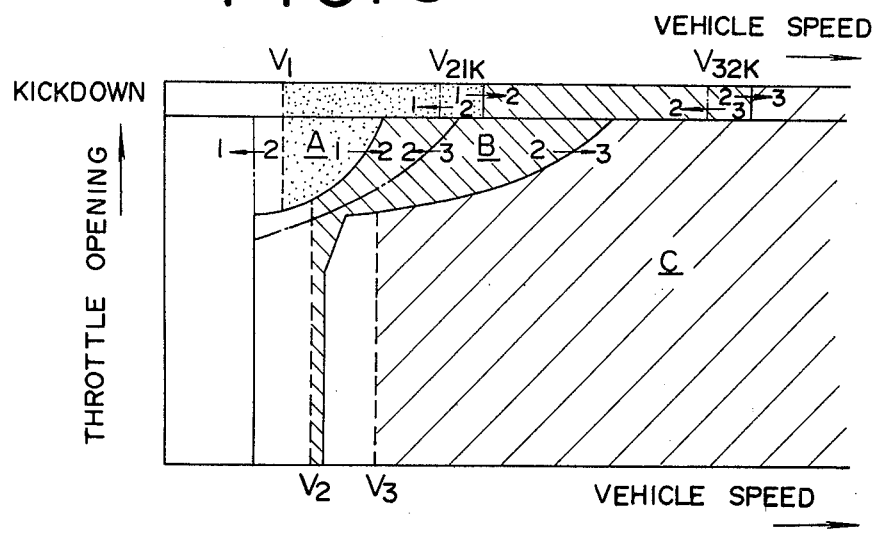
FIG. 8 is a shift pattern diagram showing the lock-up ranges.

The vehicle speed sensor 62 feeds a vehicle speed signal V corresponding to the vehicle speed to a vehicle speed comparator circuit 222, which circuit compares the vehicle speed signal V with the lock-up vehicle speed value $V_1$ for the first gear ratio, the lock-up vehicle speed value $V_2$ for the second gear ratio and the lock-up vehicle speed value $V_3$ for the third gear ratio (see FIG. 8), and issues from the corresponding one of gates a, b and c a H level signal to one of input terminals of the corresponding one of the AND gates 223, 224 and 225 when the vehicle speed V is higher than these lock-up vehicle speed values $V_1$, $V_2$ and $V_3$. The other one of the input terminals of each of the AND gates 223 to 225 is fed with a corresponding one of said first gear signal, second gear signal and third gear signal $S_1$, $S_2$ and $S_3$. Therefore, the corresponding one of the AND gates 223 to 225 issues a H level signal when the vehicle is operating in one of the lock-up ranges for the first gear, for the second gear and for the third gear, viz., when the vehicle is operating within the corresponding one of the ranges A, B and C as illustrated in FIG. 8, and when a H level signal is issued by one of the AND gates 223 to 225, this signal causes the NOR gate 226 to issue a L level signal. Although this L level signal is fed to one of input terminals of an AND gate 227 as an actuating signal for the lock-up solenoid 31, and AND gate 227 will issue a H level signal via an OR gate 228 to a base of a transistor 229, unless the pulse signal $P_1$ is impressed to the other input terminal of the AND gate 227, viz., unless a gear shifting is effected as will be understrood from the preceding description, thus rendering this transistor conductive to energize the lock-up solenoid 31 with a power supply $+V$.

Accordingly, the lock-up solenoid 31 is energized to render the torque converter 1 in a lock-up state as previously described when the vehicle operates in one of the lock-up ranges A, B and C as shown in FIG. 8 as long as the automatic transmission is not subjected to any gear shifting operation.

While the pulse signal $P_1$ is present reflecting the condition that the automatic transmission undergoes a gear shifting operation, this signal is fed to the AND gate 227 to cause this AND gate to issue a L level signal, so that even when the vehicle is operating in one of the lock-up ranges, the lock-up solenoid 31 is denergized. Thus, the torque converter 1 is released from a lock-up state to take a converter state, thus preventing the occurrence of shock inherent to gear shifting. When the vehicle operates outside of the lock-up ranges A, B and C, none of the AND gates 223, 224 and 225 issue a H level signal, thus deenergizing the lock-up solenoid 31 to hold the torque converter 1 in a converter state.

The reference numeral 76 designates the kickdown switch which is operatively connected with the accelerator pedal and is rendered ON during a kickdown range (see FIG. 8) when the accelerator pedal is deeply depressed to a level just before the fully opened position. The kickdown switch 76 is connected with the power supply $+V$ via the resistor 76, thus the signal from the kickdown switch 76 takes a L level during operation within the kickdown range, this signal being fed after being inverted by a NOT gate 230 to the base of the transistor 232. This causes the transistor 323 conductive, thus energizing the downshift solenoid 137a to force the automatic transmission to downshift. In the kickdown operation range, the automatic trasmission effects shifting according to a shift pattern shown in FIG. 9. Outside of the kickdown range the kickdown switch 76 is open and since the signal from the switch takes a H level, the automatic transmission is allowed to effect shifting according to a shift pattern shown in FIG. 8.

In addition to the above-mentioned lock-up and kickdown control, an idle switch 72 and a brake switch 73 are connected with the power source $+V$ via the resistors 74 and 75, respectively. The idle switch 72 is closed when the accelerator pedal is released, thus shifting the idle signal $S_I$ into a L level, while, it is otherwise opened to cause the idle signal $S_I$ to shift into a H level, and the brake switch 73 is closed when the brake pedal is depressed to decelerate the vehicle, causing the brake signal $S_B$ to take a L level, whereas, it is otherwise opened, causing the brake signal $S_B$ to take a H level. The idle signal $S_I$ and brake signal $S_B$ are fed to a braking memory circuit 221 at a NOR gate 233, to which NOR gate 233 the third gear ratio signal $S_3$ is fed after having been inverted by a NOT gate 234. The NOR gate 233 issues a H level signal upon depression of the brake pedal (the brake signal $S_B$ takes a L level) when the vehicle is coasting with the accelerator pedal released (the idle signal $S_I$ takes a L level) and with the automatic transmission in the third gear position (the highest gear ratio) (the third gear ratio $S_3$ takes a H level as described above) because all of the three inputs take a L level. This H level signal is fed to a OR gate 235 to cause this OR gate to issue a fuel cut permission signal $S_F$ having a H level, this H level signal being fed to an AND gate 237 of a fuel cut decision circuit 236. The AND gate 237 is fed further with a signal from a gate $\bar{d}$ of the vehicle speed comparator circuit 222, where the vehicle speed comparator circuit 222 compaares the vehicle speed signal V from the vehicle speed sensor 62 with a predetermined vehicle speed value $V_{RL}$ which is a low limit value of a vehicle speed range where the fuel cut (the suspension of the supply of fuel to the engine) is to be effected and issues from the gate $\bar{d}$ a H level signal when $V \geq V_{RL}$. In this embodiment, the value $V_{RL}$ is a value at which the characteristic curve F (see FIG. 6) intersects with the predetermined engine speed value $N_1$. The AND gate 237 issues a H level signal when the vehicle speed is higher than or equal to the predetermined vehicle speed value $V_{RL}$ during the above-mentioned operation and feeds same to a AND-gate 238. The H level signal issued from the gate $\bar{d}$ of the vehicle speed comparator circuit 222 is fed after being inverted by a NOT gate 239 to a L level to an OR gate 240, too, and since the other two inputs of said OR gate, viz., the first gear ratio signal $S_1$ and idle signal $S_I$ are L levels, the OR gate 240 issues a L level signal, this L level signal being fed after being inverted by a NOT gate to a H level to an AND gate and it is fed as it is to a reset terminal R of a flip flop circuit 242. Thus, the AND gate 238 issues a H level and feeds same to set terminal S of the flip flop circuit 242 to set the flip flop circuit because both of the inputs are H levels. When it is set, the flip flop circuit 242 issues from an output terminal Q a fuel cut signal Scut having a H level, said signal after being inverted by a NOT gate 243 to a L level to an AND gate 244, thus preventing the AND gate 244 from issuing a H level signal, suspending (fuel cut) the ordinary supply of fuel to the engine, whereas, when the fuel cut signal Scut disappears and the NOT gate 243 issues a H level signal to the AND gate 244, the supply of fuel is effected in an ordinary manner which will be described hereinafter.

Designated by 245 is an electronically controlled type fuel injection control unit which is fed with signals indicative of an operating state of an engine, such as an engine intake amount signal $Q_E$, an engine revolution speed signal $N_E$, an engine coolant temperature signal $T_E$, a throttle opening signal TH, and it performs an arithmetric operation based on these input signals and provides a positive polarity fuel injection pulse with an appropriate pulse width to an AND gate 244. Each time said fuel injection pulse is fed, the AND gate 244 produces a H level signal for a time corresponding to the pulse width to energize the transistor 246, actuating the fuel injectors 247 of the solenoid valve type, to which the fuel having a predetermined pressure is supplied, thus supplying the appropriate amount of fuel which is determined by an actuation time of the fuel injector (the pulse width of the above mentioned pulse) to the cylinder of the engine (4-cylinder engine in the illustrated embodiment) in synchronous with the engine revolution speed, enabling the engine to operate effeciently.

The above mentioned fuel cut signal Scut that is used to effect the suspension of the supply of fuel to the engine (fuel cut) is fed to an OR gate 228 via an OR gate of a lock-up release delay circuit 250 on one hand and is fed to a OR gate 231 on the other hand, causing these OR gates 228, 231 to provide H level signals to energize the associated transistors 229, 232, thereby energizing the lock-up solenoid 31 to force the torque converter 1 of the transmission to lock up to establish the forced lock-up state and energizing the downshift solenoid 137a to force the transmission to downshift in the same manner as is in the operation in the kickdown operation range. This causes an increase in engine revolution speed during operation with fuel cut by an amount corresponding to the direct coupling state due to lock-up and/or by an amount corresponding to an increase in reduction ratio due to downshift, extending the fuel cut time to the vehicle speed value $V_{RL}$ shown in FIG. 6, thus accomplishing the effect of enhancement in fuel economy even in the case of an automotive vehicle having an automatic transmission where the set engine revolution speed value $N_1$ is relatively high. For accomplishing this object, the above-mentioned forced downshift is not necessarily required and the forced downshift suffices to fullfill this object, thus allowing the fuel cut time to extend to a vehicle speed value $V_{RL}'$ shown in FIG. 6 in the case the forced lock-up only is used.

Although, in the illustrated embodiment, the description has been proceeded with a fuel cut of an electronically controlled type fuel injection engine, a fuel cut arrangement may be provided to a carburator injection engine by arranging a fuel cut valve of the construction which can selectively cut fuel supply in a fuel supply passage within a carburetor wherein the valve is directly actuated in response to the fuel cut signal $S_{cut}$.

Figure 9:
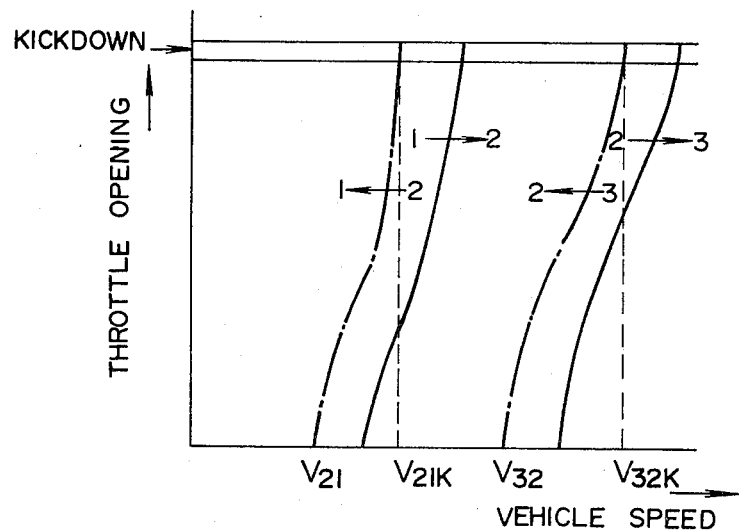
FIG. 9 is a shift pattern diagram when the downshift solenoid is energized to actuate the kickdown valve shown in FIG. 2A.

In the circumstance when the downshift solenoid 137a is energized upon effecting a forced downshift, the schedule of shifting in the automatic transmission has switched into the shift pattern shown in FIG. 9 from the ordinary shift pattern shown in FIG. 8, wherein since the throttle opening is zero when the accelerator pedal is released for coasting operation so that the throttle pressure produced by the vacuum throttle valve 139 under the control of the vacuum diaphragm 140 (see FIG. 2A) that is operable in response to an increased engine induction vacuum is low, the above mentioned forced 3-2 downshift takes place at the vehicle speed value $V_{32}$ and the 2-1 downshift takes place at the vehile speed value $V_{21}$ (see FIG. 9).

Once the fuel cut signal Scut is issued, since the AND gate 349 keeps feeding a H level signal to a OR gate 335, the OR gate 335 keeps issuing a H level fuel cut permission signal $S_F$ even after the third gear ratio signal $S_3$ has disappeared or the brake signal $S_B$ has disappeared. Thus, in this state, the fuel cut signal Scut continues to exist, thereby preventing the unintentional release of fuel cut, forced downshift and forced lock-up. This state holds until the driver depresses the accelerator pedal for acceleration.

When the L level idle signal $S_I$ changes to a H level upon depression of the accelerator pedal, or the H level first gear ratio signal $S_1$ appears, or a L level signal appears on the gate $\bar{d}$ of the vehicle speed comparator circuit 222, the OR gate 340 issues a H level signal. This H level signal is fed to a reset terminal R of the flip flop circuit 342. The H level signal issued by the NOR gate 340 is fed after being inverted by the NOT gate 341 to a L level to the AND gate 338, causing the AND gate 338 to issue a L level signal. The flip flop circuit 342 changes its state to issue a L level signal when the H level signal is fed to the reset terminal R thereof from the OR gate 340, thus causing the fuel cut signal Scut to disappear.

In the event that the OR gate 240 resets the flip flop circuit 242 to cause it to generate a L level signal (the disappearance of the fuel cut signal) from the output terminal thereof in the manner mentioned above in response to the first gear ratio signal $S_1$ or idle signal $S_I$ among the three input signals to the OR gate 240 and that the vehicle speed is still higher than or equal to the value $V_{RL}$ (see FIG. 6), the vehicle speed comparator circuit 222 provides a H level signal to a NOR gate 252 of the delay circuit 250 from the gate $\bar{d}$ to cause this NOR gate to provide a L level signal to a OR gate 251, causing the OR gate 251 to change its output signal level from a H level to a L level in response to the above-mentioned L level signal from the flip flop circuit 242, thus releasing without any time delay the forced lock-up. Viz., under the running condition like this, although the forced lock-up of the torque converter is released simultaneously with the release of the fuel cut and the release of the forced downshift, this does not cause the engine to stall as the engine speed is sufficiently high when $V \geq V_{RL}$. However, in the event that the vehicle comparator circuit 222 provides a L level signal to the OR gate 240 from the gate d to reset the flip flop circuit 242 to cause it to provide a L level signal from the output terminal Q thereof, although this L level signal is fed to the OR gate 251, the other input terminal of said OR gate continues to be impressed with a H level signal from the NOR gate for a time T (see FIG. 7B) which is determined by the resistor 254 and capacitor 255, viz., a time duration beginning with the inversion at the NOT gate 253 of the L level signal from the gate of the vehicle speed comparator circuit 222 into a H level signal and ending with the completion of the charging of the capacitor 255 after this H level signal has been fed to the capacitor via the resistor 254. Thus, after or upon expiration of the time T, the NOR gate 252 begins to provide a L level signal to the OR gate 251 to allow same to generate a L level signal, initiating the release of the forced lock-up. Therefore, in this case, the release of the forced lock-up is carried out at the moment after the time T after the moment $t_1$ when the forced downshift is released upon resumption of the supply of fuel to the engine in response to the disappearance of the fuel cut signal Scut (see FIG. 7B and FIG. 10B) so that this arrangement can avoid the inconveniences that the engine revolution speed drops rapidly upon the resumption of the supply of fuel to the engine, and as a result this insures stable resumption of the combustion in the engine.

Figure 7A:
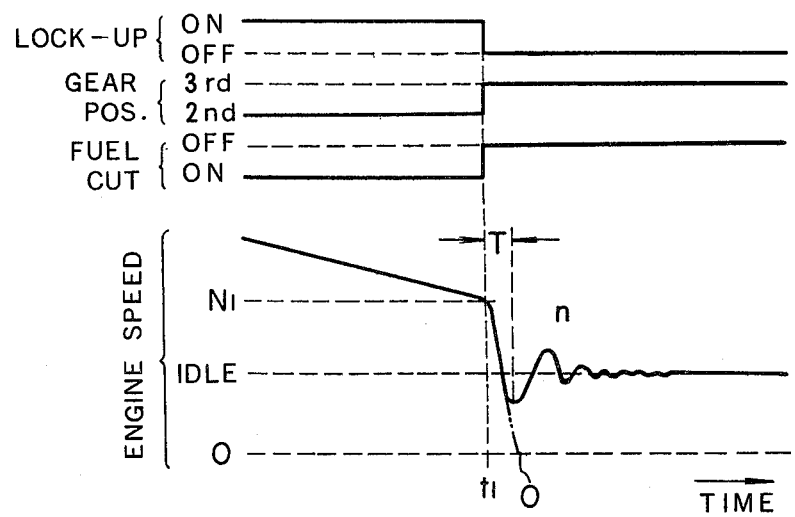
FIG. 7A is a timing diagram when the supply of fuel to the engine is resumed according to a control system shown in the copending application mentioned before.
Figure 7B:
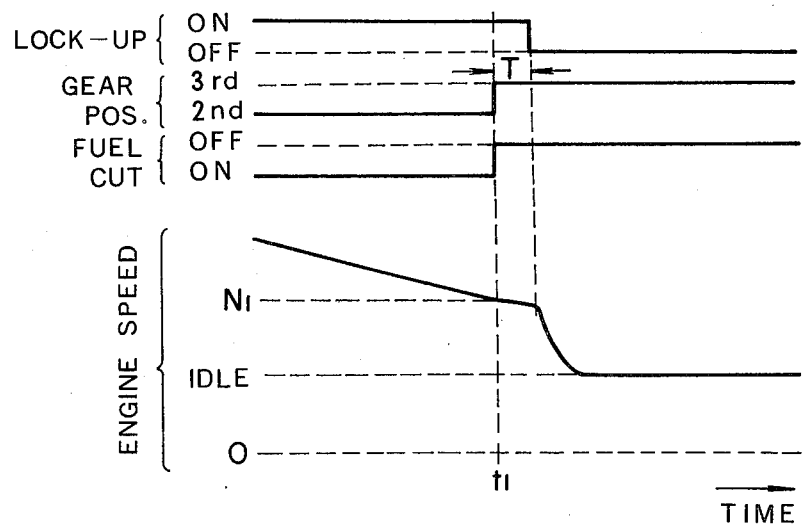
FIG. 7B is a similar view to FIG. 7 A when the supply of fuel to the engine is resumed according to the control system of the present invention.

Referring to FIGS. 7A and 7B, an explanation is hereinafter is made how the speed varies when the supply of fuel to the engine is resumed at the moment $t_1$.

Figure 6:
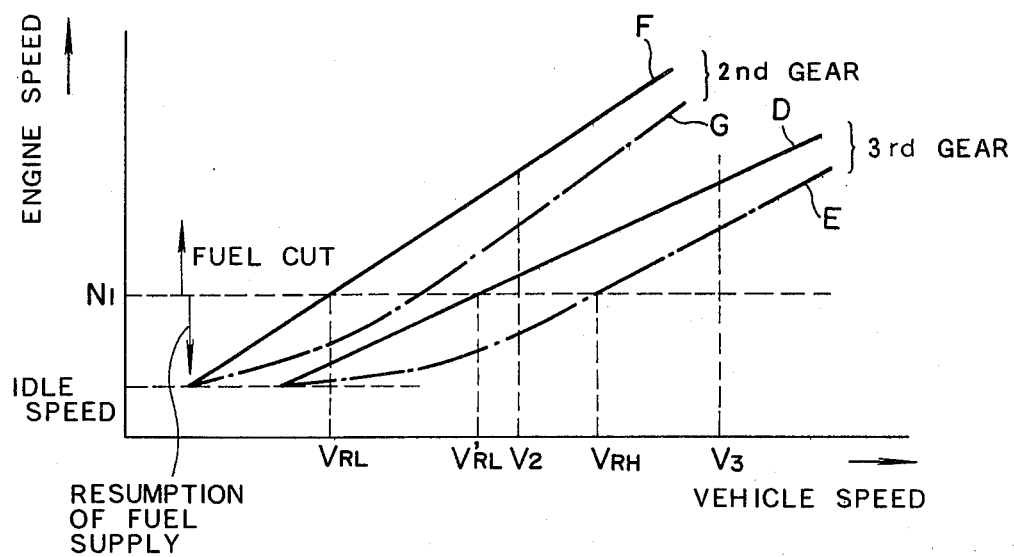
FIG. 6 shows engine speed vs., vehicle speed curves for various gear ratios with the lock-up of a torque converter and for the same gear ratios without such lock-up when the vehicle is coasting.

As shown in FIG. 7A, if, as proposed in the copending application mentioned before, the lock-up of the torque converter and the forced downshift state of the transmission are released at the same moment $t_1$ upon the resumption of the supply of fuel to the engine, the engine speed level drops from the level F to the level E shown in FIG. 6. If the vehicle speed is low and lower than the value $V_{RL}$ (see FIG. 6), the engine speed drops rapidly to such a low level that the resumption of combustion within the engine is difficult. Furthermore, the initiation of the actual combustion takes place after a predetermined time interval T after the moment $t_1$ when the fuel has been supplied again. Therefore, the engine vibrates with a peak n (see FIG. 7A) after it has started. In the worst case, the engine fails to start and stalls (as indicated by o in FIG. 7A).

Referring to FIG. 7B, there is shown the variation in the engine speed upon the resumption of the supply of fuel to the engine according to the present invention.

Assuming that the supply of fuel to the engine is resumed as a result that the vehicle speed V drops below the value $V_{RL}$ (see FIG. 6), the lock-up of the torque converter is released after a predetermined time interval T after the forced downshift of the transmission is released upon the resumption of the supply of fuel to the engine.

In this circumstance, although the engine speed drops from the level F to the level D, the engine speed will not decrease below this level D for the time interval T so as to insure the resumption of stable combustion in the engine.

Figure 10A:
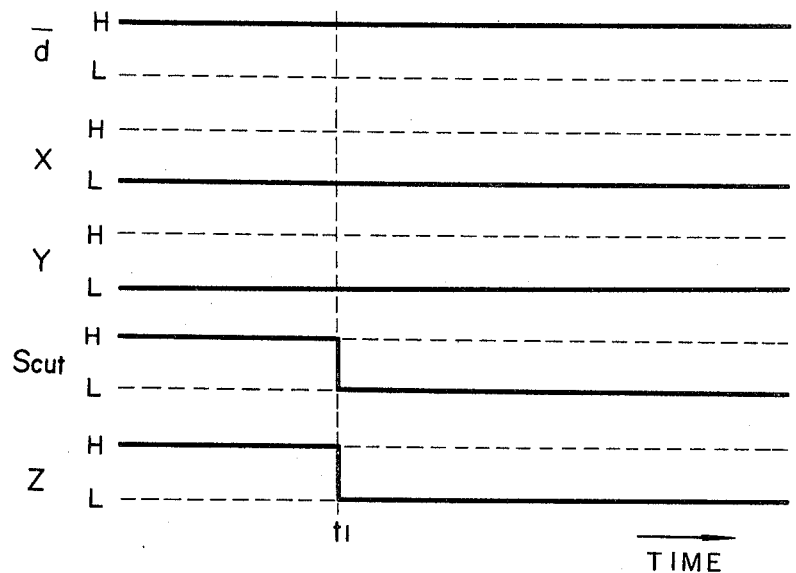
FIG. 10A is a timing diagram of signals of various points of the control system shown in FIG. 4 upon the resumption of the supply of fuel to the engine as long as the vehicle speed V is higher than $V_{RL}$ inclusive.
Figure 10B:
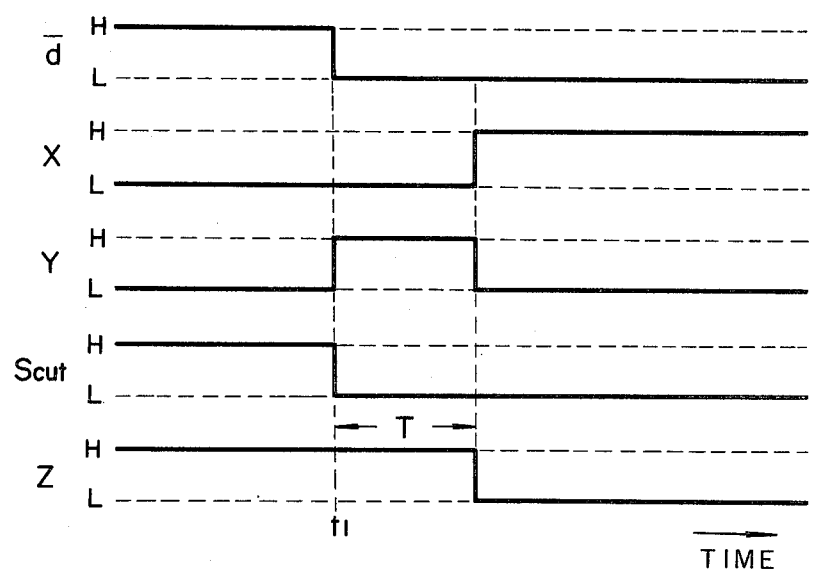
FIG. 10B is a timing diagram similar to FIG. 10A of the signals at the various points of the control system shown in FIG. 4 upon the resumption of the supply of fuel to the engine as long as V is lower than $V_{RL}$

Referring to FIGS. 10A and 10B, FIG. 10A shows a timing diagram of signals appearing at $\bar{d}$, X, Y, Q(Scut) and Z within the control system shown in FIG. 4, when the vehicle speed V is higher than the value $V_{RL}$ (see FIG. 6) inclusive, and FIG. 10B shows a timing diagram of these signals when the vehicle speed V is lower than the value $V_{RL}$.

As will be understood from FIG. 10A, the signal at Z changes from H level to L level upon the change in the level of the fuel cut signal Scut from H level to L level so that the lock up of the torque converter is released upon the resumption of the supply of fuel to the engine.

As will be understood from FIG. 10B, the signal at X remains at L level until the capacitor 255 is charged after the level of the signal appearing at d has changed its level from H to L. Thus, the signal at Y produces a pulse signal starting with the moment $t_1$ at which the signal at $\bar{d}$ has changed from H to L. As a result, the signal at Z stays at H level for the predetermined time interval T after the moment $t_1$ when the fuel cut signal Scut has changed its level from H to L. Therefore, it will be appreciated that the lock up of the torque converter is released after the predetermined time interval T after the resumption of the supply of fuel to the engine.

Figure 11:
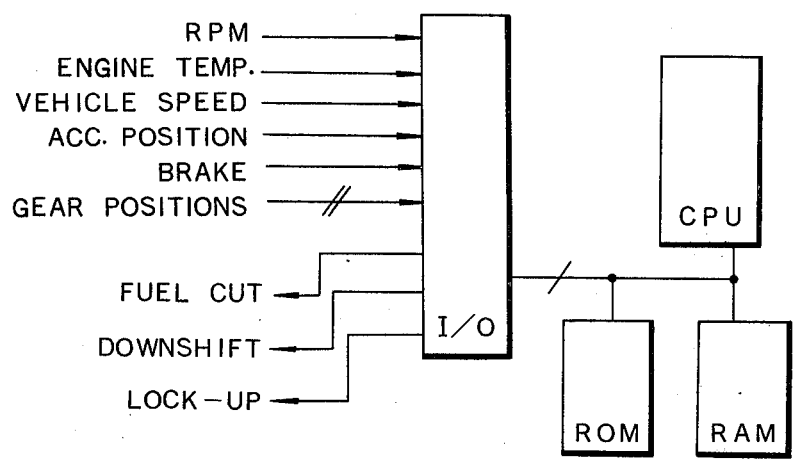
FIG. 11 is a block diagram of a second embodiment of a control system according to the present invention.

The control laws employed by the control system shown in FIG. 4 may be carried out by a system using a microcomputer as shown in FIG. 11.

FIG. 11 shows the microcomputer which includes usual components, such as RAM, ROM, CPU, I/O interface etc.

FIG. 11 shows a flow diagram implementing the control laws employed by the control system shown in FIG. 4. In a step 1001, a decision is made whether or not the vehicle is coasting by monitoring the level of the idle signal $S_I$ or the state of the idle switch 72. After the accelerator pedal has been released to cause the automotive vehicle to begin a coasting operation, the answer to the question in the decision step 1001 is YES. The control goes to a step 1050 where a decision is made whether or not the current gear position of the transmission is the first gear. If the answer to the question in the step 1050 is NO, the control goes to a step 1005A where a decision is made whether or not the vehicle speed V is higher than the vehicle speed value $V_{RL}$ inclusive. If the vehicle speed V is higher than the value $V_{RL}$ and the answer to the question in the step 1005 is YES, the control goes to a step 1006 where a decision is made whether or not the brake is actuated by monitoring the level of the brake signal $S_B$ or monitoring the state of the brake switch 73. If the answer to this question in the step 1006 is YES, the control goes to a step 1007 where a decision is made whether or not the gear position of the transmission is third gear. If the answer to this question in this step 1007 is YES, the control goes to a step 1005B where a decision is made whether or not the vehicle speed V is higher than the vehicle speed value $V_{RL}$ inclusive. If the answer to this question in the step 1005B is YES, the control goes to a step 1051 where the supply of fuel to the engine is suspended (fuel cut), the torque converter is forced to lock up and the transmission is forced to downshift. Then the control returns to the start.

Immediately after the transmission has downshifted from the third gear position to the second gear position and the torque converter has locked up upon the suspension of the supply of fuel to the engine, the engine speed jumps up to the level F from the level D (see FIG. 6) if an initial vehicle speed at which the fuel cut signal Scut is generated is higher than the lock-up vehicle speed value $V_3$ or from the level E if the initial speed value is lower than the value $V_3$. Subsequently, the engine speed decreases along the curve F as the vehicle speed decreases.

This coasting operation of the vehicle without the supply of fuel ends when the accelerator pedal is released or when the transmission downshifts into the first gear at a vehicle speed value $V_{21}$ (see FIG. 9).

In this circumstance, the answer to the question in the step 1001 is NO or the answer to the question in the step 1050 is YES. Thus, the control goes to a step 1005C where a decision is made whether or not the vehicle speed V is higher than $V_{RL}$ inclusive. If the vehicle speed is higher than $V_{RL}$ inclusive, the control goes to a step 1052 where the supply of fuel is resumed, the lock-up of the torque converter is released and the forced downshift state of the transmission is released. If the vehicle speed V is lower than the value $V_{RL}$, the answer to the question in the step 1005C is NO and the control goes to a step 1053 where the supply of fuel to the engine is resumed and the forced downshift state of the transmission is released. Then, the control goes to a step 1054 where a preset time is delayed. After the preset time after the supply of fuel to the engine has been resumed, the lock up of the torque converter of the transmission is released in a step 1055.

Another condition when the supply of fuel to the engine is resumed is when ther answer to the question in the step 1050A is NO, viz., the vehicle speed V is lower the $V_{RL}$. If this happens the control goes to the step 1053 and followed by the steps 1054 and 1055. Thus, the lock-up of the torque converter is released after the preset time after the supply of fuel to the engine has been resumed.

Figure 12:
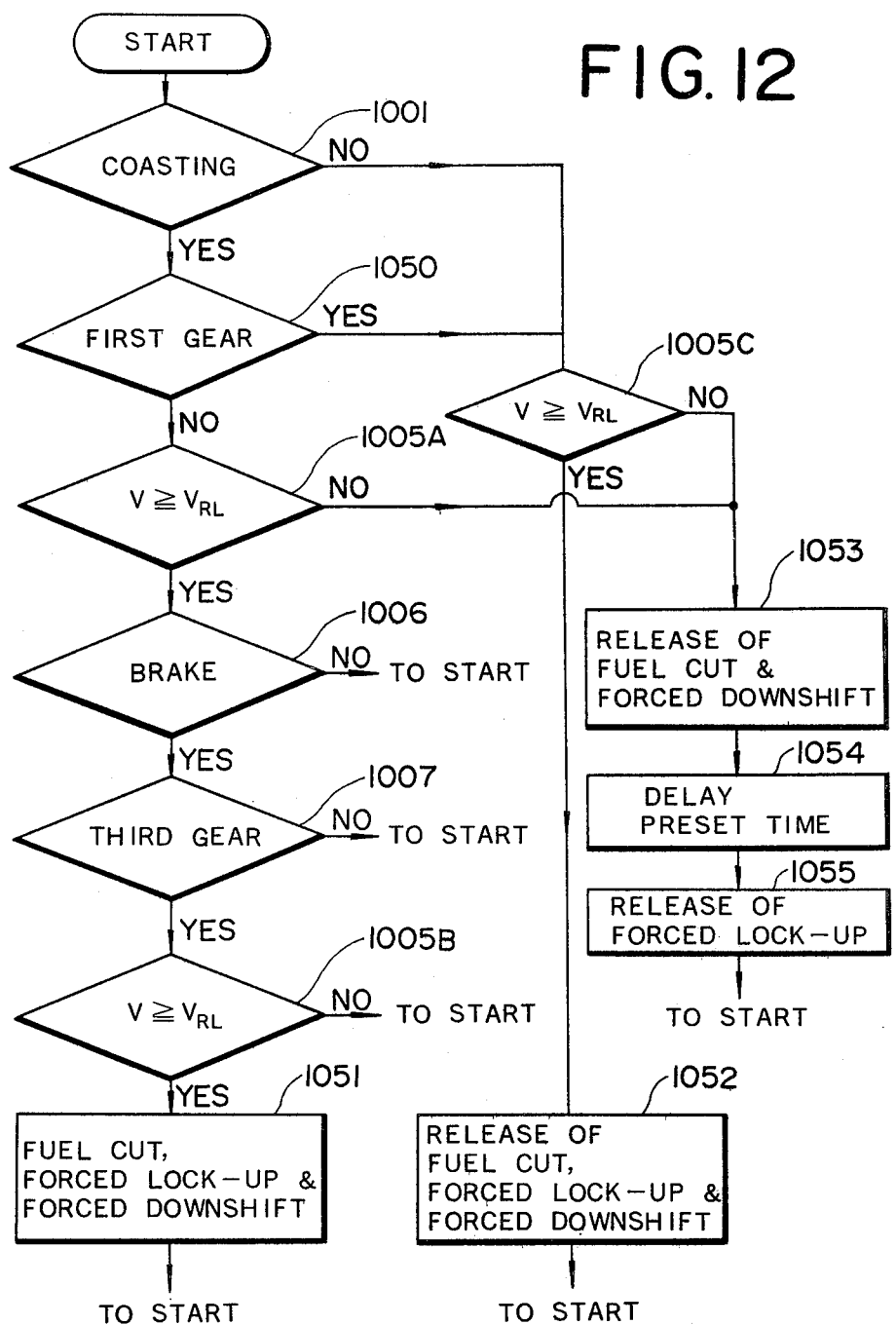
FIG. 12 is a flow diagram of the second embodiment of the control system.

Although in the preceding description the forced downshift is effected in the step 1051 and released in the step 1052 and in the step 1053, the execution of the forced downshift and the release thereof may be removed from the flow diagram shown in FIG. 12.

What is claimed is:

1. A control system for a lock-up type automatic transmission for an automotive vehicle having an engine and an accelerator pedal, the lock-up type automatic transmission having a lock-up type torque converter, the engine having fuel cut means for suspending the supply of fuel to the engine after the accelerator pedal has been released to cause the automotive vehicle to begin a coasting operation, the suspension of the supply of fuel to the engine being kept as long as the engine operates in a predetermined state which allows the engine to resume combustion to operate again upon resumption of the supply of fuel to the engine, said control system comprising:
   means for forcing the lock-up type torque converter to lock up at least when the engine operates in the predetermined state,
   means for supplying fuel to the engine when the engine operates in a second predetermined state, and
   means for releasing the lock-up of the lock-up torque converter only after a predetermined condition after the fuel is supplied to the engine by said fuel supplying means.

2. A control system as claimed in claim 1, wherein said predetermined condition is a predetermined time interval only when the vehicle speed is lower than a predetermined vehicle speed value.

3. A control system as claimed in claim 1 or 2, including
   means for forcing the lock-up type automatic transmission to downshift at least when the engine operates in the first predetermined state, and
   means for releasing the forced downshift state of the lock-up type automatic transmission after the fuel is supplied to the engine by said fuel supplying means.

4. A control system as claimed in any one of claims 1-2, including a microcomputer responsive at least to a coasting operation and the first and second predetermined states.

5. A control system for a lock-up type automatic transmission for an automotive vehicle having an engine and an accelerator pedal, the lock-up type automatic transmission having a lock-up type torque converter, the engine having fuel cut signal generating means for generating a fuel cut signal after the accelerator pedal has been released to cause the automotive vehicle to begin a coasting operation, the fuel cut signal being generated as long as the engine operates in a predetermined state which allows the engine to resume combustion to operate again upon resumption of the supply of fuel to the engine, and fuel cut means responsive to the fuel cut signal for suspending the supply of fuel to the engine, said control system comprising:
   means for generating a lock-up command signal when the fuel cut means suspends the supply of fuel to the engine;
   lock-up means responsive to said lock-up command signal for forcing the lock-up type torque converter to lock up; and
   means for stopping generating said lock-up command signal only after a predetermined condition after the resumption of fuel to the engine by the fuel cut means.

6. A control system as claimed in claim 5, wherein said predetermined condition is a predetermined time interval only when the vehicle is lower than a predetermined vehicle speed value.

7. A control system as claimed in claim 6, including
   means for generating a downshift command signal when the fuel cut means begins suspending the supply of fuel to the engine, the generation of said downshift command signal being stopped upon the resumption of the supply of fuel to the engine by the fuel cut means; and
   downshift means responsive to said downshift command signal for forcing the automatic transmission to downshift.

8. A control method for a lock-up type automatic transmission for an automotive vehicle having an engine and an accelerator pedal, the lock-up type automatic transmission having a lock-up type torque converter, the engine having fuel cut means for suspending the supply of fuel to the engine after the accelerator pedal has been released to cause the automotive vehicle to begin a coasting operation, the suspension of the supply of fuel to the engine being kept as long as the engine operates in a predetermined state which allows the engine to resume combustion to operate again upon resumption of the supply of fuel to the engine, said control method comprising:
   forcing the lock-up type torque converter to lock-up at least when the engine operates in the predetermined state;
   supplying fuel to the engine when the engine operates in a second predetermined state, and
   releasing the lock-up of the lock-up torque converter only after a predetermined condition after the fuel is supplied to the engine by said fuel.

9. A control method for a lock-up type automatic transmission for an automotive vehicle having an engine and an accelerator pedal, the lock-up type automatic transmission having a lock-up type torque converter, the engine having a fuel cut signal after the accelerator pedal has been released to cause the automotive vehicle to begin a coasting operation, the fuel cut signal being generated as long as the engine operates in a predetermined state which allows the engine to resume combustion to operate again upon the resumption of fuel to the engine and fuel cut means responsive to the fuel cut signal for suspending the supply of fuel to the engine, said control method comprising:
   generating a lock-up command signal when the fuel cut means suspends the supply of fuel to the engine;
   forcing the torque converter to lock up responsive to said lock-up command signal;
   stopping generating said lock-up command signal only after a predetermined condition after the resumption of fuel to the engine by the fuel cut means.

10. A control system as claimed in claim 3 including a microcomputer responsive at least to a coasting operation and the first and second predetermined states.

* * * * *